US009931969B1

(12) United States Patent
Muldowney

(10) Patent No.: US 9,931,969 B1
(45) Date of Patent: Apr. 3, 2018

(54) ADJUSTABLE CUPHOLDER

(71) Applicant: Ford Global Technologies, LLC, Dearborn, MI (US)

(72) Inventor: Phillip Kerry Muldowney, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/422,645

(22) Filed: Feb. 2, 2017

(51) Int. Cl.
*B60N 3/10* (2006.01)

(52) U.S. Cl.
CPC .................... *B60N 3/106* (2013.01)

(58) Field of Classification Search
CPC ......... B60N 3/106; B60N 3/105; B60N 3/107
See application file for complete search history.

(56) References Cited

U.S. PATENT DOCUMENTS

| 4,715,633 | A | * | 12/1987 | Brink | A47G 23/0216 |
| | | | | | 220/737 |
| 6,070,844 | A | * | 6/2000 | Salenbauch | A47G 23/0216 |
| | | | | | 248/311.2 |
| 6,758,452 | B1 | | 7/2004 | Salenbauch et al. | |
| 8,695,843 | B1 | * | 4/2014 | Brinas | B60N 3/102 |
| | | | | | 220/737 |
| 8,757,572 | B1 | * | 6/2014 | Starr | F16M 13/02 |
| | | | | | 224/556 |
| 2003/0226945 | A1 | * | 12/2003 | Pacher | B60N 3/102 |
| | | | | | 248/311.2 |
| 2005/0001127 | A1 | * | 1/2005 | Schaal | B60N 3/102 |
| | | | | | 248/311.2 |
| 2007/0290109 | A1 | * | 12/2007 | Ahlburg | B60N 3/105 |
| | | | | | 248/311.2 |
| 2008/0099505 | A1 | * | 5/2008 | Lawlor | B60N 3/106 |
| | | | | | 222/93 |
| 2008/0128573 | A1 | * | 6/2008 | Lawlor | B60N 3/106 |
| | | | | | 248/313 |
| 2010/0078531 | A1 | * | 4/2010 | Boinais | B60N 3/106 |
| | | | | | 248/147 |
| 2015/0297010 | A1 | * | 10/2015 | Gantz | A47G 23/0216 |
| | | | | | 220/739 |
| 2016/0000248 | A1 | * | 1/2016 | Shen | B60N 3/102 |
| | | | | | 220/737 |
| 2016/0304019 | A1 | * | 10/2016 | Dargavell | B60N 3/106 |
| 2017/0328612 | A1 | * | 11/2017 | Lofy | F25D 31/005 |

* cited by examiner

Primary Examiner — Jason S Morrow
(74) Attorney, Agent, or Firm — Vichit Chea; Brooks Kushman, P.C.

(57) ABSTRACT

An adjustable vehicle cupholder is provided. The adjustable cupholder may include a console including a recessed portion defining a cupholder and a track extending along a length of the console. The track preferably terminates at the cupholder. The vehicle cupholder may also include a spiraling fitting that has an elongated shape and extends from the track. The spiraling fitting may be configured to spiral from a first diameter to a second smaller diameter as the spiraling fitting moves along the track and within an inner periphery of the cupholder.

20 Claims, 5 Drawing Sheets

ADJUSTABLE CUPHOLDER

TECHNICAL FIELD

This disclosure relates to an adjustable cupholder assembly for motor vehicles.

BACKGROUND

Motor vehicles typically include cup holders that provide storage areas for beverages. The cup holders are typically built into, or attached to one or more interior components of the vehicle. In some instances, the cupholder may be limited to holding only certain sized beverage containers.

SUMMARY

According to one embodiment of this disclosure, an adjustable vehicle cupholder is disclosed. The adjustable cupholder may include a console including a recessed portion defining a cupholder and a track extending along a length of the console. The track preferably terminates at the cupholder. The vehicle cupholder may also include a spiraling fitting that has an elongated shape and extends from the track. The spiraling fitting may be configured to spiral from a first diameter to a second smaller diameter as the spiraling fitting moves along the track and within an inner periphery of the cupholder.

According another embodiment of this disclosure, an adjustable cupholder in an interior vehicle trim panel is provided. The trim panel may include a recessed portion that defines a cupholder and has an inner periphery. A track may be disposed within and extend along a length of the panel and terminates within an aperture defined by the inner periphery. A spiral member may move along the track and the inner periphery of the cupholder to provide a reduced diameter for retaining the beverage.

According to yet another embodiment of this disclosure, an adjustable cupholder is disclosed. The adjustable cupholder may include an interior vehicle panel that defines a recessed cupholder that has an inner periphery. The panel may include a track that is disposed within and extends along a length of the panel and terminates within an aperture defined by the inner periphery of the recessed cupholder. A spiral member is preferably moveable along the track and may be configured to move along the inner periphery of the cupholder to provide a reduced diameter for retaining a beverage.

The cupholders as generally described above may each include one or more of the following additional embodiments.

The spiraling fitting may define an outer surface and inner surface. As the spiraling fitting moves along the track, the outer surface of the spiraling fitting preferably moves along the inner periphery of the cupholder.

The spiraling fitting may be configured to move from a most rearward position to a most forward position. When in the most forward position the inner surface preferably defines a first diameter and when in the most rearward position the spiraling fitting is preferably retracted from the cupholder and the inner periphery of the cupholder defines a second diameter greater than the first diameter.

The inner surface of the spiraling fitting may define a surface configured to hold a beverage container.

As the spiraling fitting moves from the track into the cupholder, a first portion of the outer surface of the spiraling fitting may be adjacent to the inner periphery of the cupholder and a second portion of the outer surface of the spiraling fitting may be adjacent to the inner surface of the first portion of the spiraling fitting.

The adjustable cupholder may also include a handle that is fixed to the spiraling fitting and extending out of a slot defined by the console. The handle is preferably adapted for grasping and moving the spiraling fitting. The slot defined by the console preferably defines a rearward and forward stop.

The spiral member of the adjustable cupholder is preferably configured to move from a most rearward position to a most forward position. When in the most forward position the spiral member defines a diameter less than a diameter defined by the inner periphery of the cupholder.

The spiral member may be comprised of at least one first section and at least one second section. Either the first section or the second section may define a recessed portion and the other section may define a protrusion that engages the recessed portion of the other section so that the first and second sections are pivotally connected.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Motor vehicles typically include cup holders that provide storage areas for beverages. The cup holders are typically built into, or attached to one or more interior components of the vehicle. In some instances, the cupholder may be limited to holding only certain sized beverage containers. Beverage containers may have various diameters, depending on size of drink they hold. Energy drinks such as Red Bull™ often come in a 52 mm diameter can, 12 oz. or 16.9 oz. soda or pop cans and bottles such as Coke-a-Cola™ often come in a 66 mm diameter can or bottle, and a coffee mug or larger receptacle may have a diameter of 80 mm. If a cupholder is too large, a smaller container may slip or slide as within the cupholder causing it to spill. If the cupholder is too small, the driver may be inconvenienced because their beverage cannot be held by the cupholder.

In the following discussion of the figures, a polar coordinate system is utilized. A directional length extends from the front of the vehicle to the rear of the vehicle. A directional width is transverse to the directional length.

Figure 1:
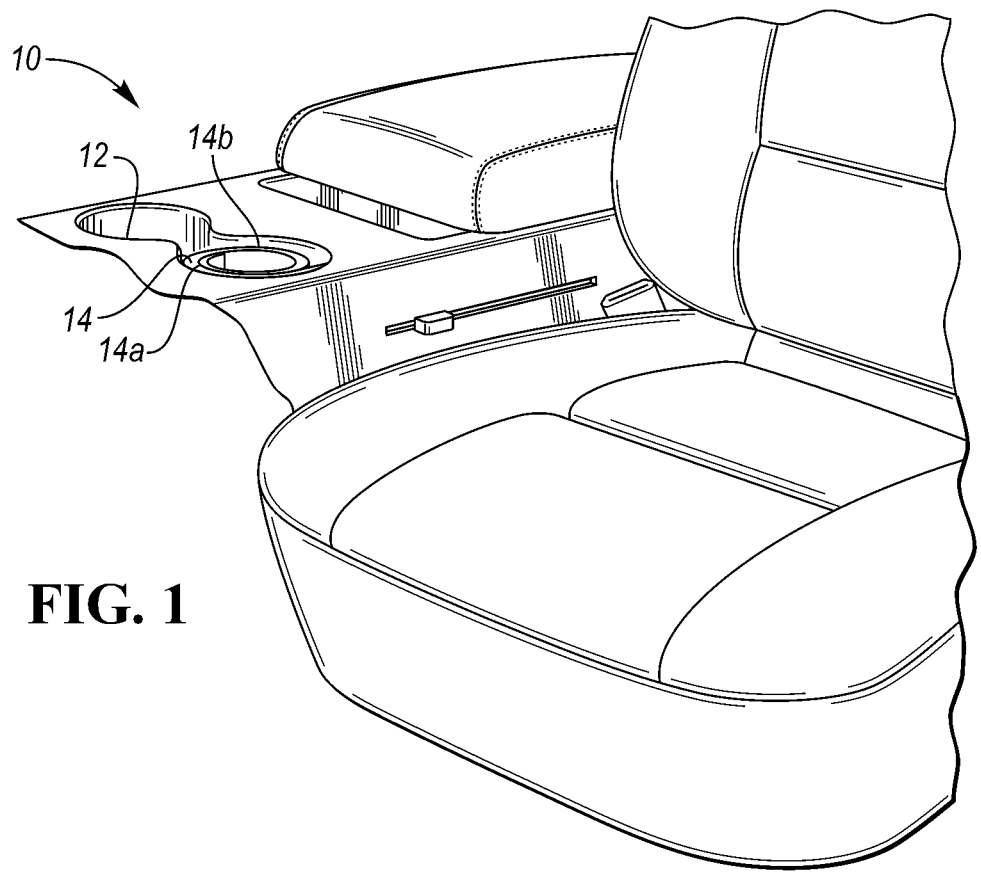
FIG. 1 is an environmental view of an example console including an adjustable cup holder according to one embodiment of this disclosure.
Figure 2:
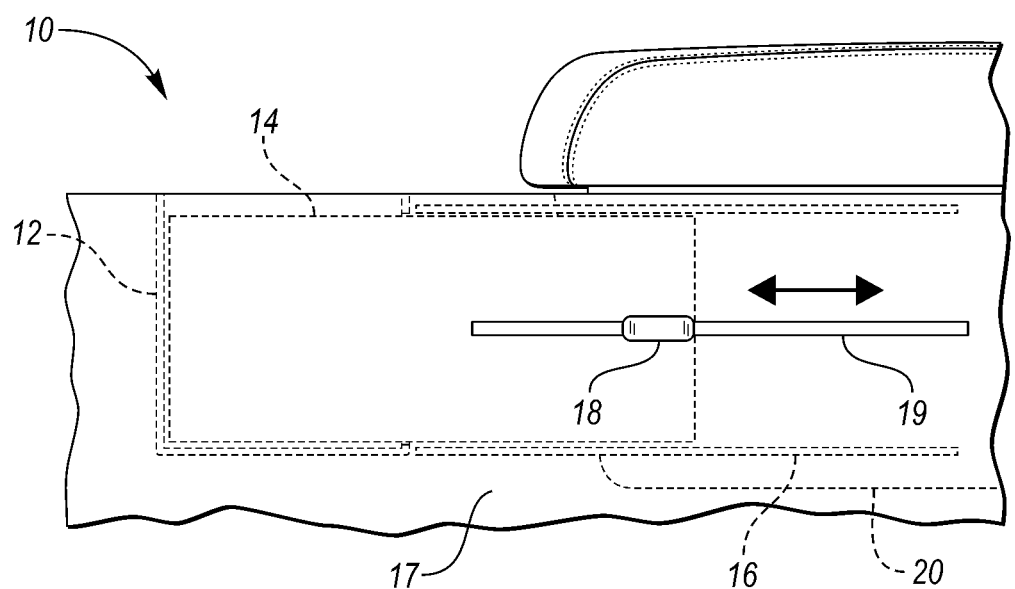
FIG. 2 is a side view of an example console including an adjustable cup holder according to one embodiment of this disclosure.

Referring to FIGS. 1 and 2, an environmental view and side view of an example vehicle console 10 is illustrated. The console 10 includes a recessed portion defining a cupholder 12. While the cupholder 12 shown here includes two portions capable of holding two beverage containers, other configurations capable of holding a various number of beverages may be utilized. An adjustable or spiral fitting 14 is shown partially spiraled within the cupholder 12. The spiral fitting may be an elongated member that has a proximal end and a distal end. The distal end extends out of the console or track 16 and into the cupholder 12. Preferably the distal end has a width that is less than the proximal end. For the purposes of this disclosure, elongated means the object has a greater length than width. The spiral fitting 14 has an exterior surface 14a and an interior surface 14b. The interior surface 14b is configured to hold the beverage container and the exterior surface is configured to move against the inner periphery of cupholder 12 and against other portions of the spiral fitting as it spirals. The spiral fitting 14 extends from a track 16 disposed within the console 10. Preferably, the proximal end of the spiral fitting 14 is disposed further away from the cupholder 12 and the distal end is preferably positioned closest to the cupholder 12. The track 16 extends along a portion of the length of the console 10 between an external wall 17 and a storage cavity 20. A handle 18 is attached to spiral fitting 14 and extends out of the slot 19 defined by the external wall 17 of the vehicle console 10.

Figure 3:
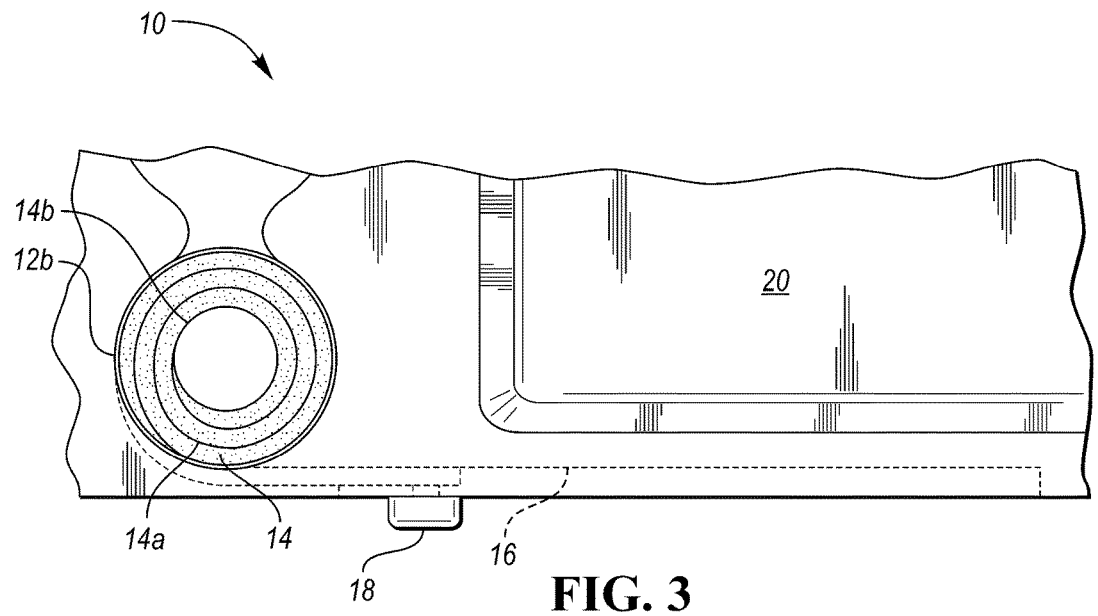
FIG. 3 is a top view of an example adjustable cup holder assembly in the forward-most position.

Referring to FIG. 3, a top view of the adjustable cupholder having the spiral fitting 14 in the most forward position is illustrated. In the most forward position, the spiral fitting 14 may completely fill the first cupholder portion 12 or take up a majority of the space within the cupholder. The area where the slot 19 terminates or ends in the external wall 17 may act as a stop for the forward most position. But another feature such as a protrusion or fastener may also serve as a stop to prevent the spiral fitting 14 from extending too far or being moved off of the track 16.

Figure 4:
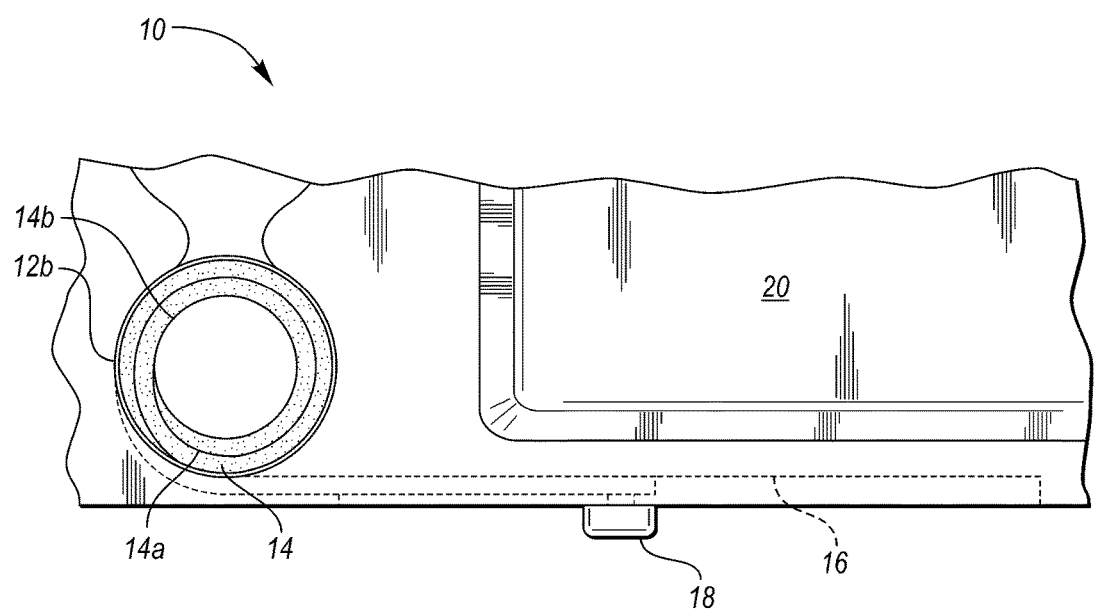
FIG. 4 is a top view of an example adjustable cup holder assembly in a mid position.

Referring to FIG. 4, a top view of the adjustable cupholder having the spiral fitting 14 in a mid position illustrated. In this mid position, the inner surface of the spiral fitting 14b provides a diameter of approximately 53 mm. In this position the spiral fitting is able to accommodate and hold a beverage container with a smaller diameter, such as an energy drink can or other beverage.

Figure 5:
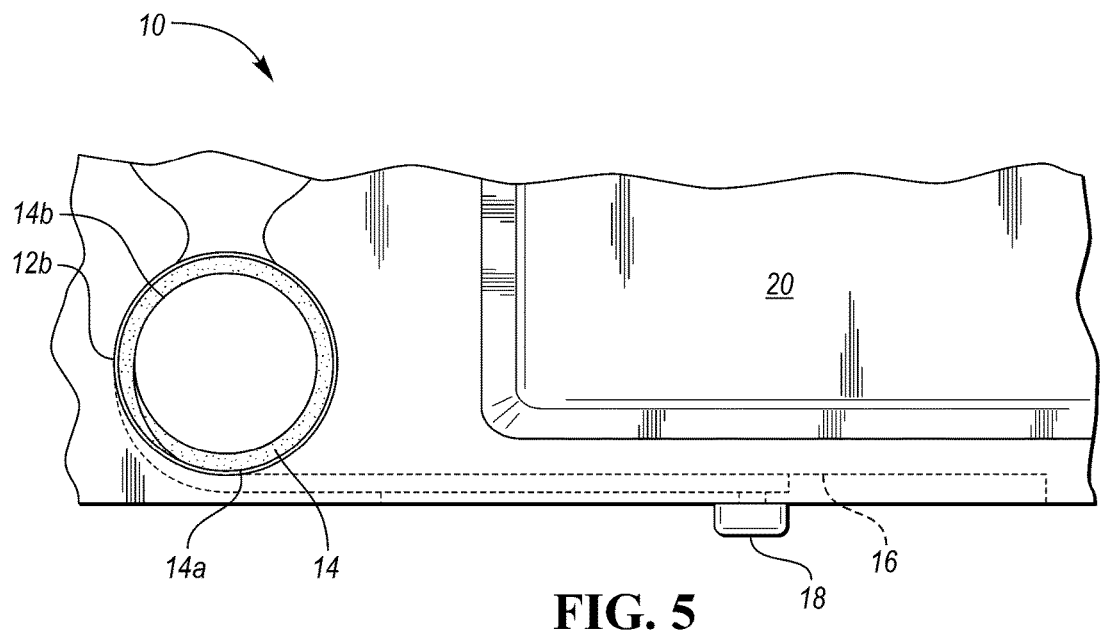
FIG. 5 is a top view of an example adjustable cup holder in a rear position.

Referring to FIG. 5, a top view of the adjustable cupholder having the spiral fitting 14 in a rearward position is illustrated. In this rearward position, the inner surface of the spiral fitting 14b provides a diameter of approximately 66 mm. In this position the spiral fitting is able to accommodate and hold a beverage container with a diameter slightly larger than the beverage discussed in FIGS. 3 and 4, such as a soda can or bottle.

Figure 6:
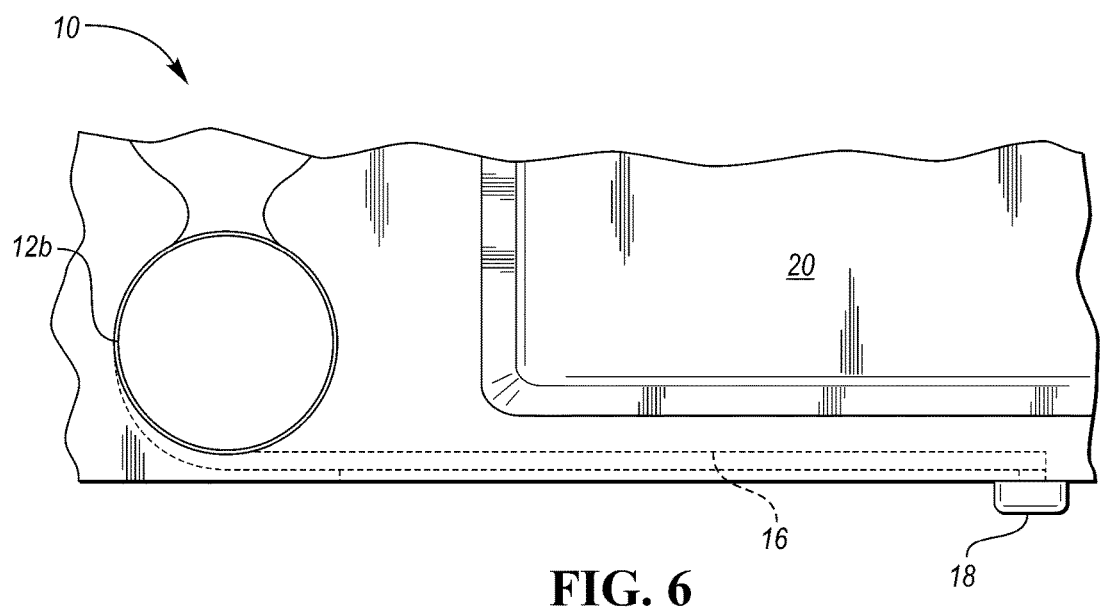
FIG. 6 is a top view of an example adjustable cup holder in the rearmost position.

Referring to FIG. 6, a top view of the adjustable cupholder having the spiral fitting 14 in the rearmost position is illustrated. In this most rear position, the inner surface of the spiral fitting 14b is completely retracted from the first cupholder 12. In this position the inner periphery of the cupholder accommodates a larger beverage container having a diameter of approximately 80 mm.

While specific diametrical sizes defined by the position of the spiral fitting 14 are mentioned above, they are for illustration purposes only and other sizes may be utilized depending on the application. The spiral fitting 14 is preferably sized to fit within the track 16 in such a way to allow a user to move the spiral fitting 14 to a predetermined position along the track, and the designed fit between the fitting 14 and track 16, will maintain the predetermined position, until the spiral fitting 14 is moved to another desired position. The spiral fitting may be locked or held stable within a track at a predetermined location by other means besides those mentioned above, e.g. a locking tab or other locking means.

Figure 7:
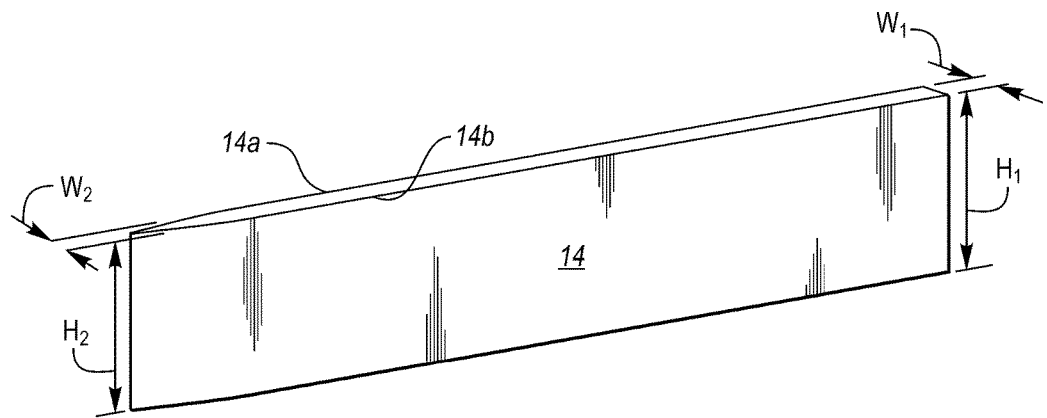
FIG. 7 is a perspective view of the spiral fitting of the example adjustable cupholder.

Referring to FIG. 7, a perspective view of a first embodiment of a spiral fitting is illustrated. The spiral fitting 14 illustrated is a one-piece design comprised of a polymeric or rubber material that is capable of bending and conforming along the inner periphery of the cupholder as it is displaced along the track 16. The spiral fitting 14 has an outer surface 14a and an inner surface 14b. The height of the spiral fitting as noted on the proximal end $H_1$ and the height of the distal end $H_2$ are equivalent. The spiral fitting has sufficient height to extend from a bottom portion of the cupholder to a mid-portion of the cup holder. This height may provide a larger surface area of engagement between the spiral fitting 14 and a beverage container. The spiral fitting may have a first width $W_1$ at the proximal end and a second width $W_2$ measured at the distal end. In the preferred embodiment the width of the distal end $W_2$ is less than the width of the proximal end $W_1$. Because the spiral fitting narrows from the proximal to the distal end, it can provide numbers inner diameters as the fitting is moved along the track. The available materials include but are not limited to Acrylonitrile Butadlene and Styrene (ABS), Polypropylene (PP), Thermoplastic olefin (TPO), Polycarbonate, thermoplastic elastomer (TPE), Ethylene-Propylene-Diene-Rubber (EPDM), or cross-linked styrene-ethylene butylene-styrene (SEBS).

Figure 8:
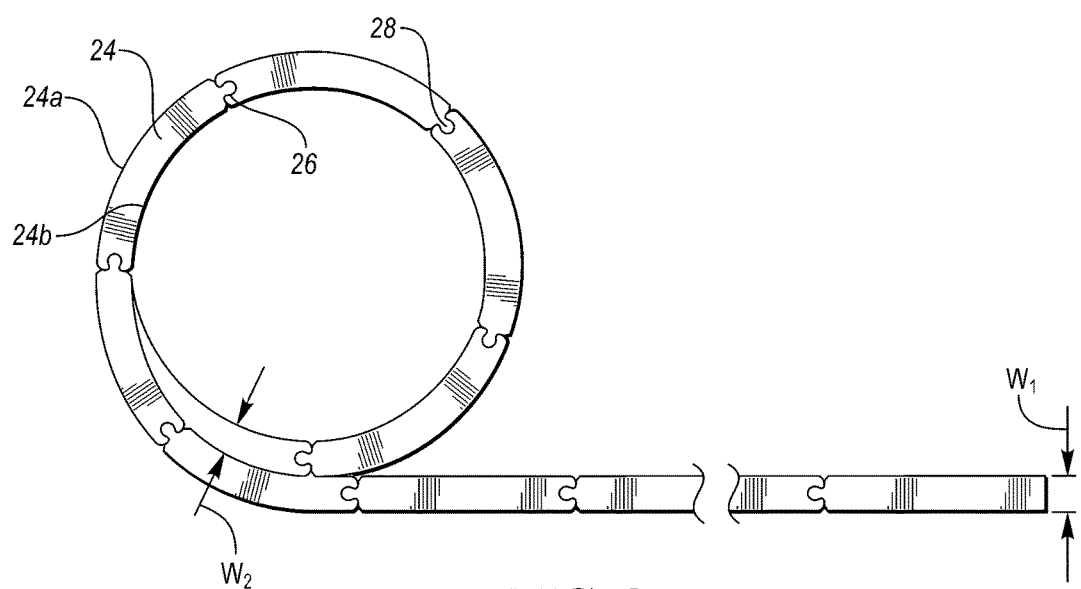
FIG. 8 is a perspective view of the spiral fitting according to a second embodiment of this disclosure.

Referring to FIG. 8, a multi-piece spiral fitting 24 is illustrated. The multi-piece spiral fitting has an external surface 24a and an internal surface 24b. Each piece of the mutli-piece fitting has a recessed portion 26 and a protrusion 28. The recessed portion 26 and protrusion 28 cooperate to provide a pivotable connection between the sections. As mention above in reference to the spiral fitting of FIG. 7, the multi-piece spiral fitting has sufficient height to extend from a bottom portion of the cupholder to a mid-portion of the cup holder. This height may provide a larger surface area of engagement between the spiral fitting 14 and a beverage container. The spiral fitting may have a first width $W_1$ at the proximal end and a second width $W_2$ measured at the distal end. In the preferred embodiment the width of the distal end $W_2$ is less than the width of the proximal end $W_1$.

Figure 9:
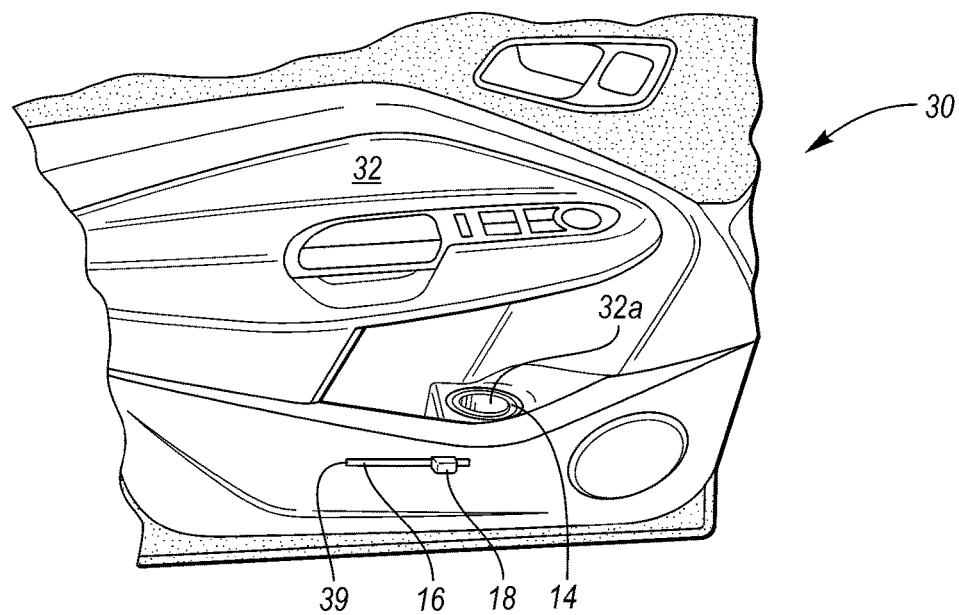
FIG. 9 is a top view of an example vehicle door panel including the adjustable cupholder.

Referring to FIG. 9, a perspective view of an example door panel including the adjustable cupholder is illustrated. A vehicle door 30 includes a door panel 32 including a recessed cupholder 32a. The spiral fitting 14 has an exterior surface 14a and an interior surface 14b. The spiral fitting 14 extends from a track 16 disposed within the door panel 32. Preferably, the proximal end of the spiral fitting 14 is disposed further away from the cupholder 12 and the distal end is preferably positioned closes to the cupholder 12. The track 16 extends along a portion of the length of the door panel 32 and is between the door panel 32 and the metal vehicle door. The handle 18 is attached to the spiral fitting 14 and extends out of the slot 39 defined by the vehicle panel 32.

Figure 10:
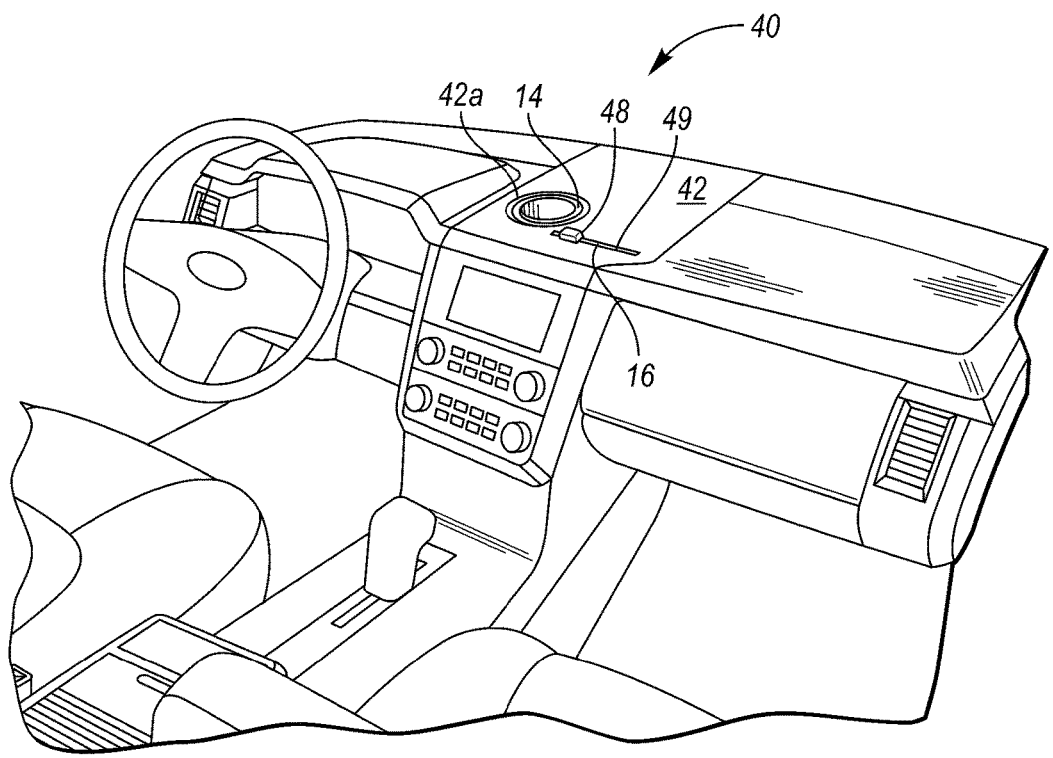
FIG. 10 is a perspective view of an example vehicle dashboard including the adjustable cupholder.

Referring to FIG. 10, a perspective view of an example dashboard panel 40 including the adjustable cupholder is illustrated. The dashboard 40 includes a dashboard panel 42 including a recessed cupholder 42a. The spiral fitting 14 has an exterior surface 14a and an interior surface 14b. The spiral fitting 14 extends from a track 16 disposed within the console 10. Preferably, the proximal end of the spiral fitting 14 is disposed further away from the cupholder 42a and the distal end is preferably positioned closes to the cupholder 42a. The track 16 extends along a portion of the length of the dashboard panel 42 and a handle 48 is attached to the spiral fitting 14 and extends out of the slot 49 defined by the vehicle panel 42.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustable vehicle cupholder comprising:
   a console including a recessed portion defining a cupholder and a track extending along a length of the console and terminating at the cupholder; and
   a spiraling fitting having an elongated shape extending from the track and configured to spiral from a first diameter to a second smaller diameter as the spiraling fitting moves along the track and within an inner periphery of the cupholder.

2. The adjustable vehicle cupholder of claim 1, wherein the spiraling fitting defines an outer surface and an inner surface, and wherein as the spiraling fitting moves along the track, the outer surface of the spiraling fitting moves along the inner periphery of the cupholder.

3. The adjustable vehicle cupholder of claim 2, wherein the spiraling fitting is configured to move from a most rearward position to a most forward position, wherein in the most forward position the inner surface defines a first diameter, wherein in the most rearward position the spiraling fitting is retracted from the cupholder, and wherein the inner periphery of the cupholder defines a second diameter greater than the first diameter.

4. The adjustable vehicle cupholder of claim 3, wherein the spiraling fitting and the track cooperate to provide sufficient friction to hold the spiraling fitting in a selectively fixed position along the track to form a third diameter, wherein the third diameter corresponds to the selectively fixed position along the track.

5. The adjustable vehicle cupholder of claim 1, wherein the spiraling fitting extends between a bottom portion of the cupholder to a mid portion of the cupholder.

6. The adjustable vehicle cupholder of claim 1, further comprising a handle fixed to the spiraling fitting and extending out of a slot defined by the console, wherein the handle is adapted for grasping and moving the spiraling fitting.

7. The adjustable cupholder of claim 6, wherein the slot defined by the console defines a rearward and forward stop.

8. An adjustable cupholder comprising:
   an interior vehicle panel defining a recessed cupholder having an inner periphery;
   a track disposed within and extending along a length of the panel and terminating within an aperture defined by the inner periphery; and
   a spiral member movable along the track and configured to move along the inner periphery of the cupholder to provide a reduced diameter for retaining a beverage.

9. The adjustable cupholder of claim 8, wherein the spiral member is configured to move from a most rearward position to a most forward position, and wherein in the most forward position the spiral member defines a diameter less than a diameter defined by the inner periphery of the cupholder.

10. The adjustable vehicle cupholder of claim 8, wherein the spiral member extends between a bottom portion of the recessed cupholder to a mid-portion of the recessed cupholder to provide stability to hold a beverage.

11. The adjustable cupholder of claim 8, wherein the spiral member has a distal end defining a first width and a proximal end defining a second width greater than the first, and wherein as the spiral member moves within the cupholder the distal end of the spiral member occupies space defined by the recessed cupholder.

12. The adjustable cupholder of claim 8, wherein the spiral member defines an outer surface and inner surface, and wherein as the spiral member moves along the track, the outer surface of the spiral member moves along the inner periphery of the cupholder.

13. The adjustable vehicle cupholder of claim 8, further comprising a handle fixed to the spiral member and extending out of a slot defined by the panel, wherein the handle is adapted for grasping and moving the spiral member.

14. The adjustable vehicle cupholder of claim 8, wherein the interior vehicle panel defining the recessed cupholder is an interior door panel.

15. The adjustable cupholder of claim 8, wherein the spiral member and the track cooperate to provide sufficient friction to hold the spiral member in a predetermined position within the track to form a corresponding diameter configured to hold a beverage.

16. An adjustable cupholder within an interior vehicle trim panel comprising:
    a recessed portion defining a cupholder disposed within the panel having an inner periphery;
    a track disposed within and extending along a length of the panel and terminating within an aperture defined by the inner periphery; and
    a spiral member movable along the track and configured to move along the inner periphery of the cupholder to provide a reduced diameter for retaining a beverage.

17. The interior vehicle trim panel of claim 16, wherein the spiral member is configured to move from a most rearward position to a most forward position, and wherein in the most forward position the spiral member defines a diameter less than a diameter defined by the inner periphery of the cupholder.

18. The interior vehicle trim panel of claim 16, wherein the spiral member has a distal end defining a first width and a proximal end defining a second width greater than the first, and wherein as the spiral member moves within the cupholder the distal end of the spiral member occupies space defined by the recessed cupholder.

19. The interior vehicle trim panel of claim 16, wherein the spiral member is comprised of at least one first section and at least one second section, wherein either the first section or the second section defines a recessed portion, and wherein the other section defines a protrusion that engages the recessed portion of the other section so that the first and second sections are pivotally connected.

20. The interior vehicle trim panel of claim 16, wherein the spiral member and the track cooperate to provide sufficient friction to hold the spiral member in a predetermined position within the track to form a diameter, corresponding to the predetermined position within the track.

\* \* \* \* \*